United States Patent Office 2,952,667
Patented Sept. 13, 1960

2,952,667
POLYAMIDES OF 4-CARBOXYPIPERIDINE

John R. Caldwell, Kingsport, Tenn., assignor to Eastman Kodak Company, Rochester, N.Y., a corporation of New Jersey No Drawing. Filed Mar. 26, 1958, Ser. No. 723,979

5 Claims. (Cl. 260—78)

This invention relates to polyamides from 4-carboxypiperidine (isonipecotic acid), and to the preparation of these resinous materials.

I have found that 4-carboxypiperidine represented by the following structural formula:

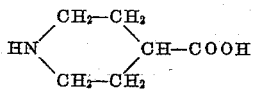

is capable of not only self-condensing at elevated temperatures to give a resinous homopolyamide represented by the following recurring structural unit:

I
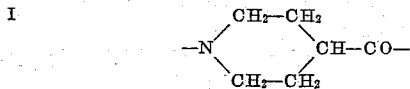

but is also readily co-condensable with various aminoacids represented broadly by the following general formula:

$$H_2N—R—COOH$$

or with salts of various dicarboxylic acids and diamines represented by the following general formulas:

$$HOOC—R_1—COOH$$
and
$$H_2N—R_2—NH_2$$

wherein R, $R_1$ and $R_2$ each represents a divalent aliphatic, aromatic or alicyclic group, in the proportions of at least 50 mole percent of the 4-carboxypiperidine component, the advantageous range being from 50–95 mole percent but preferably from 50–80 mole percent of the 4-carboxypiperidine, to give resinous copolyamides. Thus, these copolyamides consist of at least 50 mole percent of recurring units of above structure I and the remainder of the molecule of recurring units of the general structure:

II  —HN—R—CO— or of recurring units of the general structure:

III  —HN—$R_2$—NH—CO—$R_1$—CO— wherein R, $R_1$ and $R_2$ are as previously defined. This result is unexpected because the isomeric 2-carboxy and 3-carboxypiperidines do not give homopolyamides or copolyamides when heated by themselves or with the above-mentioned aminoacids and salts. The copolyamides are especially useful and are preferred.

The above-defined homopolyamide and copolyamides of the invention are characterized by having relatively high melting points, above 350° C. for the homopolyamide and from 240–320° C. for the copolyamides. They can be readily melted and worked into fibers and sheet materials by extrusion methods and molded, for example, by compression molding methods. Such shaped articles are clear and transparent, and are characterized by having good physical properties. The polyamides are insoluble in common organic solvents, but soluble in, for example, hot trifluoroacetic acid from which solution they can be cast into flexible films. The polyamides are further characterized by good affinity for commercial dyes dyeing well with cellulose acetate dyes, premetallized dyes and some acid wool dyes.

It is, accordingly, an object of the invention to provide a new class of resinous polyamides. Another object is to provide resinous materials that are readily dyeable and especially useful for preparing fibers, sheets and molded articles that are characterized by clearness and uniformity, by good strength and elasticity, by having relatively high softening and melting points and by good stability under heated conditions. Another object is to provide a process for preparing the new resinous polyamides. Other objects will become apparent hereinafter.

In accordance with the invention, I prepare the new class of polyamides by heating the 4-carboxypiperidine alone or with one or more of the defined aminoacids or with one or more of the defined salts of dicarboxylic acids and diamines, at 210–350° C. in an inert atmosphere such as nitrogen. In a preferred embodiment of the invention, the reactants are heated in a sealed vessel in the presence of water at 210–250° C. for 1–2 hours. The water vapor is then released and the product is heated at a temperature above the melting point until the desired viscosity is obtained. For the preparation of polyamides that melt higher than about 300° C., it is preferred to use the solid phase method of building up the viscosity. In this process, the reactants are heated in a closed vessel, in the presence of water, at 210–250° C. for 1–2 hours. Water vapor is released so that a pressure of 200–350 p.s.i. is maintained in the vessel. The vessel is then cooled to room temperature and the product is removed. At this stage, it is a prepolymer with an inherent viscosity of 0.2–0.4. The prepolymer is then granulated and heated in a vacuum or in an inert atmosphere at 10–50° C. below the melting point for 2–4 hours. Advantageously, the reaction mixture is stirred during the condensing reaction. In general, the proportions of the respective recurring units in the copolyamides will be found to be approximately the same as the mole proportions of the reactants. The 4-carboxypiperidine of the invention is prepared by the catalytic hydrogenation of isonicotinic acid as described by C. A. Grob and E. Renk, Helv. Chim. Acta., 37, pages 1672–80 (1954); C.A., 49, page 12473 (1955).

Suitable aminoacids that can be used in the invention include straight chain aliphatic aminoacids having the structure $H_2N(CH_2)_nCOOH$, wherein $n$ stands for a whole number of 5–12, branched chain aliphatic aminoacids of the same range of carbon atoms, alicyclic aminoacids and aromatic aminoacids, e.g. 5-amino-n-valeric acid, 6-amino-n caproic acid, 7-amino-n-heptanoic acid, 12-amino-n-dodecanoic acid, 3-methyl-6-aminohexanoic acid, 4,4-dimethyl-7-aminoheptanoic acid, and 4-ethyl-6-aminohexanoic acid. Other suitable aminoacids include α-amino-p-toluic acid, α-amino-m-toluic acid, 4-aminocyclohexanecarboxylic acid, and 3-aminomethylcyclohexanecarboxylic acid. Suitable salts of dicarboxylic acids and diamines include aliphatic dicarboxylic acids containing from 4–12 carbon atoms between the carboxyl groups, either straight or branched chains, alicyclic acids such as 1,3- and 1,4-cyclohexanedicarboxylic acids, and acids containing one or more aromatic nuclei such as represented by isophthalic acid, terephthalic acid, 4,4'-sulfonyldibenzoic acid, etc. The acids may contain one or more ether groups in the molecular chain as represented by ethylenedioxydiacetic acid, 4,4'-oxydibutyric acid, and 3,3'-oxydipropionic acid. The acids may contain sulfide or sulfone groups in the chain. Suitable aliphatic diamines include those containing 4 to 12 carbon atoms between the amino groups, either straight or branched chains, alicyclic diamines such as 1,3-diaminocyclohexane, 1,4-diaminocyclohexane, 1,4-cyclohexanebis(methylamine), 1,3-cyclohexanebis(methylamine), etc., and amines containing one or more aromatic nuclei such as represented by o-, m-, and p-xylene-α,α'-diamines, 3,4'-di(aminomethyl) diphenyl, etc. The amines may contain one or more ether, sulfide, or sulfone groups in the chain.

The following examples will serve to illustrate further the new polyamides and the manner of their preparation.

Example 1

10 parts by weight of 4-carboxypiperidine and one part by weight of water were placed in an autoclave and the free space was purged with nitrogen. The autoclave was then closed and the temperature was raised to 250° in a period of 30 minutes. During this time, water vapor was released so that a pressure of 250–300 p.s.i. was maintained in the vessel. The temperature was then held at 250° C. for one hour. The vessel was cooled and the prepolymer obtained was removed. It was granulated to a particle size of 60-mesh and heated at 300–320° C. for 1 hour. The polymer softened in the range of 380–400° C. It could be extruded as filaments, rods, or films at about 400° C. It was soluble in hot trifluoroacetic acid and films could be cast from the solution. Anaylsis showed that the product was the homopolyamide of 4-carboxypiperidine and consisted essentially of the following recurring unit:

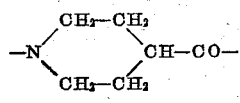

Example 2

A copolyamide was prepared by placing 2.6 g. (0.02 mole) of 4-carboxypiperidine, 2.3 g. (0.02 mole) of caprolactam, and 0.5 g. water in a tube. The tube was evacuated and sealed. It was then heated at 250° C. for one hour, with agitation. The tube was then cooled and opened. The prepolymer was heated at 250° C. for 2 hours. It was melted at this temperature. The copolyamide had an inherent viscosity of 0.7 as measured in a mixture of 60 henol-40 tetrachloroethane. It softened in the range of 225–240° C. This copolyamide was found to be particularly valuable as a molding plastic because it remains clear and transparent after molding. The copolyamide consisted of equimolar quantities in linear combination of the following recurring units:

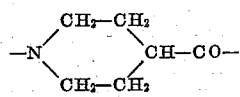

and —HN—CH₂CH₂CH₂CH₂CH₂—CO—

Example 3

Using the general procedure described in Example 2, a copolyamide was made from two molecular proportions of 4-carboxypiperidine and one molecular proportion of caprolactam. It melted in the range of 265–280°. This copolyamide is particularly valuable for the manufacture of fibers. It is also useful as a molding plastic and for the manufacture of films. The copolyamide consisted of the same structural units as the product of Example 2, except that the proportions of the recurring unit from the 4-carboxypiperidine constituted 66⅔ mole percent and the recurring unit from the caprolactam constituted 33⅓ mole percent of the copolyamide.

Example 4

Using the procedure described in Example 2, a copolyamide made from three molecular proportions of 4-carboxypiperidine and one molecular proportion of caprolactam melted in the range of 310–325° C. It was valuable for the manufacture of fibers, films, and molded objects. The copolyamide consisted of the same structural units as the product of Example 2, except that the proportions of the recurring unit from the 4-carboxypiperidine constituted 75 mole percent and the recurring unit from the caprolactam constituted 25 mole percent of the copolyamide.

Example 5

Using the procedure described in Example 2, a copolyamide was made from three molecular proportions of 4-carboxypiperidine and one molecular proportion of the salt of hexamethylenediamine and adipic acid. It melted in the range of 290–310° C. and was useful for the manufacture of fibers, films, and molded objects. The copolyamide consisted of 75 mole percent of the following recurring unit:

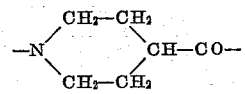

in linear combination with 25 mole percent of the following recurring unit:

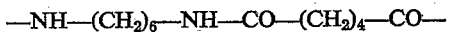

Example 6

Using the procedure described in Example 2, a copolyamide was made from three molecular proportions of 4-carboxypiperidine and one molecular proportion of the salt of hexamethylenediamine and sebacic acid. It melted in the range of 270–285° C. and was useful as a molding plastic. The copolyamide consisted of 75 mole percent of the following recurring unit:

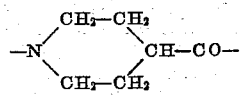

in linear combination with 25 mole percent of the following recurring unit:

By following the procedures of the above examples for the preparation of copolyamides, other resinous copolyamides having generally similar properties can be prepared by co-condensing 4-carboxypiperidine with any of the mentioned aminoacids and salts of dicarboxylic acids with diamines. If desired, materials such as fillers, dyes, lubricants, plasticizers, and the like, can be incorporated into the homopolyamide and the copolyamides of the invention. They are thermoplastic and can be fashioned by melt spinning, by extrusion techniques or by compression molding or by coating solutions thereof in certain solvents, e.g. from hot trifluoroacetic acid, into stable shaped articles such as fibers, sheets, etc. The sheet materials are suitable as photographic film supports.

What I claim is:

1. A linear fiber-forming polyamide of at least 50 mole percent of 4-carboxypiperidine and from 0–50 mole percent of a compound selected from the group consisting of (1) an aminoacid represented by the general formula:

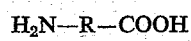

wherein R represents a member selected from the group consisting of a saturated aliphatic hydrocarbon group containing 5–12 carbon atoms, a divalent aliphatic group containing 6 carbon atoms, a phenylene group and a tolylene group and (2) a salt of (a) a dicarboxylic acid represented by the general formula:

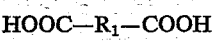

wherein R₁ represents a member selected from the group consisting of a divalent saturated aliphatic hydrocarbon group containing from 4-12 carbon atoms, a divalent alicyclic group containing 6 carbon atoms, a phenylene group, a tolylene group, a —$C_6H_4$—$SO_2$—$C_6H_4$— group, a —$CH_2O$—$C_2H_4$—$OCH_2$— group, a $$-C_2H_4-O-C_2H_4-$$

group and a —$C_3H_6$—O—$C_3H_6$— group, and (b) a diamine represented by the general formula:

$$H_2N-R_2-NH_2$$

wherein $R_2$ represents a member selected from the group consisting of a divalent saturated aliphatic hydrocarbon group containing from 4-12 carbon atoms, a divalent alicyclic group containing 6 carbon atoms, a xylylene group, a

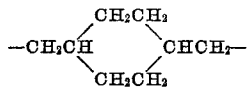

group and a —$CH_2$—$C_6H_4$—$C_6H_4$—$CH_2$— group, the said polyamide having a softening point from 240° C. to >350° C.

2. A linear fiber-forming homopolyamide of 4-carboxypiperidine having a softening point of >350° C.

3. A linear fiber-forming copolyamide of from 50–95 mole percent of 4-carboxypiperidine and from 50–5 mole percent of caprolactam, the said copolyamide having a softening point of from 240°–320° C.

4. A linear fiber-forming copolyamide of from 50–95 mole percent of 4-carboxypiperidine and from 50–5 mole percent of the salt of hexamethylene diamine and adipic acid, the said copolyamide having a softening point of from 240°–320° C.

5. A linear fiber-forming copolyamide of from 50–95 mole percent of 4-carboxypiperidine and from 50–5 mole percent of the salt of hexamethylene diamine and sebacic acid, the said copolyamide having a softening point of from 240°–320° C.

References Cited in the file of this patent

UNITED STATES PATENTS 2,688,011     Wheatley et al. _____ Aug. 31, 1954